(12) United States Patent
Song et al.

(10) Patent No.: US 8,788,646 B2
(45) Date of Patent: Jul. 22, 2014

(54) HOME GATEWAY POLICY CONTROLLING DEVICE, SYSTEM AND IMPLEMENTING METHOD THEREOF

(75) Inventors: Jun Song, Shenzhen (CN); Mo Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 177 days.

(21) Appl. No.: 13/054,181

(22) PCT Filed: Dec. 18, 2008

(86) PCT No.: PCT/CN2008/073576
§ 371 (c)(1),
(2), (4) Date: Jan. 14, 2011

(87) PCT Pub. No.: WO2010/006492
PCT Pub. Date: Jan. 21, 2010

(65) Prior Publication Data
US 2011/0119368 A1 May 19, 2011

(30) Foreign Application Priority Data

Jul. 17, 2008 (CN) .......................... 2008 1 0132479

(51) Int. Cl.
*G06F 15/173* (2006.01)
*H04L 12/28* (2006.01)
*H04L 12/56* (2006.01)
*H04L 12/24* (2006.01)

(52) U.S. Cl.
CPC ............ *H04L 12/2834* (2013.01); *H04L 47/10* (2013.01); *H04L 41/5003* (2013.01)
USPC ........... 709/223; 709/224; 709/225; 709/226; 709/229; 370/228; 370/230; 370/235; 370/310

(58) Field of Classification Search
CPC .. H04L 12/2834; H04L 47/10; H04L 41/5003
USPC .......... 370/230, 310, 228, 235, 338; 455/406, 455/433; 709/223, 225, 226, 229; 726/1
See application file for complete search history.

(56) References Cited

U.S. PATENT DOCUMENTS

| 6,611,863 B1 | 8/2003 | Banginwar |
| 2007/0162599 A1* | 7/2007 | Nguyen ........................ 709/225 |
| 2008/0049648 A1* | 2/2008 | Liu et al. ....................... 370/310 |

FOREIGN PATENT DOCUMENTS

| CN | 101222453 A | 7/2008 |
| CN | 101252586 A | 8/2008 |
| CN | 101309227 A | 11/2008 |

OTHER PUBLICATIONS

English-language abstract of Chinese Patent No. 101252586 A, European Patent Office, Aug. 27, 2008.

(Continued)

*Primary Examiner* — Kambiz Zand
*Assistant Examiner* — Noura Zoubair
(74) *Attorney, Agent, or Firm* — DASCENZO Intellectual Property Law, P.C.

(57) ABSTRACT

An apparatus for implementing policy control for home gateway comprises a Co-located Policy Decision Function Entity (PD-FE) for receiving the QoS policy issued by the PD-FE at network side and sending the QoS policy to the home gateway or issuing the QoS policy configured thereon to the home gateway. A method for implementing the policy control for home gateway, the method comprises: the Co-located PD-FE receiving the QoS policy issued by the PD-FE at network side or being configured with the QoS policy; and the Co-located PD-FE issuing the QoS policy to home gateways. With the present invention, the Resource and Admission Control Function (RACF) avoids controlling the home gateway directly or sending the policy to the home gateways in the case that there are a lot of home gateways and all the home gateways are scattered at the edge of the network.

8 Claims, 4 Drawing Sheets

(56) References Cited

OTHER PUBLICATIONS

Gai, Silvan, et al., "QoS Policy Framework Architecture," Network Working Group, Internet Engineering Task Force, The Internet Society, Feb. 10, 1999, pp. 1-30.

"Output—Draft Recommendation Y.RACF (Y.2111) Release 2 (Version 0.4.0)," Telecommunication Standardization Sector, International Telecommunication Union, Seoul, Jan. 14-25, 2008, pp. 1-115.

\* cited by examiner

HOME GATEWAY POLICY CONTROLLING DEVICE, SYSTEM AND IMPLEMENTING METHOD THEREOF

TECHNICAL FIELD

The present invention relates to the field of communication, and more especially, to an apparatus, system and method for implementing policy control for home gateways.

BACKGROUND OF THE RELATED ART

In the Next Generation Network (NGN), the Quality of Service (QoS) problem is particularly conspicuous since the bearer network applies the packet technology, thus the International Telecommunication Union (ITU) provides a Resource and Admission Control Function (RACF) to solve the QoS problem in the NGN bearer network. The main function of the RACF is to control the resource and admission based on the operating strategy according to user subscription QoS information and the network internal available resource. The RACF shields the difference of the bearer layer from the application layer, and maps the QoS attribute of the application layer to the bearer layer to make the bearer layer transport entity provide QoS guarantee to the media stream of the session under its guidance.

In the latest RACF draft of ITU, the functional framework of the RACF is as shown in FIG. 1, wherein, the Policy Decision Function Entity (PD-FE) acquires media stream session information from the Service Control Function (SCF) via the Rs interface and acquires the transport resource subscription information from the Network Attachment Control Function (NACF) via the Ru interface to make the preliminary QoS policy, and then interact with the Transport Resource Control Function Entity (TRC-FE) to determine whether there is enough QoS resource or not, and then make the final policy, and then send the policy to the Policy Execute Function Entity (PE-FE) for execution.

The TRC-FE is mainly responsible for resource control, and it monitors the network resource and collects the related information and makes a response when the PD-FE requests for resource according to the specific resource condition.

The PE-FE mainly performs the policy control (gating, bandwidth, traffic sorting and labeling, traffic shaping, layer 2 and layer 3 QoS mapping, and collecting and reporting the resource use information) under the guidance of the PD-FE.

The TRE-FE is currently described in protocol to execute the layer 2 policy related to the transport technology under the guidance of the TRC-FE, however its specific function and scope are not determined yet.

In recent years, the fixed network operators' income from voice and broadband services increases more and more slowly, and based on the change of competition and demands, the fixed network operators need to operate from the single service such as pure data or voice to multi-service as combination of video, voice and data, so as to retain and attract more domestic customers. In view of the technology and products, terminal products capable of supporting a plurality of services and a plurality of ports, and distinguishing different QoSs, that is, the Home Gateway (HG), and the QoS control is the key for the operators developing the digital home service.

FIG. 2 illustrates how the RACF performs policy control for HG currently, and in FIG. 2:

The Home Policy Execute Function Entity (HPE-FE) is a PE-FE located in the HG and it receives the policy issued by the RACF and performs policy control for the user's service traffic according to the policy.

When a user initiates a QoS guaranteed service, the QoS of the service is determined by negotiation of the service layer, and the service control layer sends a resource request to the RACF according to the negotiated QoS, and the RACF generates the QoS policy of the transport layer and sends it to the transport layer policy execute entity (including the HPE-FE in the HG) for execution, and the specific flow is as shown in FIG. 3 and comprises the following steps:

Step 301: the SCF sends a resource request to the PD-FE according to the QoS negotiated by the service layer;

Step 302: the PD-FE authorizes the request and makes the preliminary policy, and if there is no user subscription information in the PD-FE, the PD-FE acquires the user subscription information by interacting with the NACF;

Step 303: the PD-FE requests the TRC-FE for resource, and the TRC-FE makes decision for the request according to the condition of the current resource and returns the information on whether there is enough available resource or not;

Step 304: the PD-FE makes the final admission policy decision according to the resource availability;

Step 305*a, b*: the PD-FE issues the policy to the HPE-FE and the PE-FE respectively;

Step 306*a, b*: the HPE-FE and the PE-FE returns an acknowledgement to the PD-FE respectively;

Step 307: the PD-FE returns a resource request acknowledgement to the SCF.

However, the following problem exists in the above method: since there are a lot of HGs and the HGs are scattered at the edge of the network, the RACF function is too complicated if it directly controls the HGs and issues policy to the HGs, which equals integrating partial capability of the network management.

SUMMARY OF THE INVENTION

The present invention provides an apparatus, system and method for implementing policy control for home gateway to solve the problem that the RACF function is too complicated.

To solve the above problem, the present invention provides an apparatus for implementing policy control for a home gateway. The apparatus comprises a Co-located Policy Decision Function Entity (PD-FE);

the Co-located PD-FE being used to receive Quality of Service (QoS) policy issued by a PD-FE at network side and send the QoS policy to the home gateway.

Furthermore, the apparatus may have the following features:

the Co-located PD-FE is configured in a server controlling and managing the home gateway remotely.

Furthermore, the apparatus may have the following features:

the server controlling and managing the home gateway remotely is an auto-configuration server (ACS).

Furthermore, the apparatus may have the following features:

Rd interface is applied to connect the Co-located PD-FE and the PD-FE at network side; Rh interface is applied to connect the Co-located PD-FE and the home gateway.

To solve the above problem, the present invention also provides an apparatus for implementing policy control for a home gateway. The apparatus comprises a Co-located Policy Decision Function Entity (PD-FE);

the Co-located PD-FE being used to issue Quality of Service (QoS) policy configured thereon to the home gateway.

To solve the above problem, the present invention also provides a system for implementing policy control for a home gateway. The system comprises a Service Control Function (SCF), a Policy Decision Function Entity (PD-FE) at network side, a Transport Resource Control Function Entity (TRC-FE), a Policy Execute Function Entity (PE-FE) and a Customer Premises Network (CPN), and the system further comprises:

a Co-located PD-FE used to receive Quality of Service (QoS) policy issued by the PD-FE at network side and send the QoS policy to the home gateway in the CPN; or used to issue QoS policy configured thereon to the home gateway.

Furthermore, the system may have the following features:

the home gateway in the CPN comprises a Home Policy Execute Function Entity (HPE-FE) for receiving QoS policy issued by the Co-located PD-FE and performing policy control for user's service traffic according to the QoS policy.

Furthermore, the system may have the following features:

the Co-located PD-FE is configured in a server controlling and managing the home gateway remotely.

To solve the above problem, the present invention also provides a method for implementing policy control for a home gateway, comprising the following steps of:

a Co-located Policy Decision Function Entity (PD-FE) receiving Quality of Service (QoS) policy issued by a PD-FE at network side or being configured with the QoS policy; and the Co-located PD-FE issuing the QoS policy to the home gateway.

Furthermore, the method may comprise the following steps of:

a user initiating a QoS guaranteed service, and a service layer determining the QoS of the service through negotiation, and a Service Control Function (SCF) initiating a resource request to the PD-FE at network side according to the QoS policy negotiated by the service layer;

the PD-FE authorizing the resource request, making a preliminary policy decision, and then requesting a Transport Resource Control Function Entity (TRC-FE) for resource:

the TRC-FE making a decision for the resource request according to current resource condition and returning a resource availability information indicating whether there is enough available resource or not.

the PD-FE making a final admission policy decision according to the resource availability information and issuing the policy to a Policy Execute Function Entity (PE-FE) and the Co-located PD-FE;

after receiving the policy, the Co-located PD-FE selecting a suitable home gateway according to the policy and translating the policy to a policy supported by a Home Policy Execute Function Entity (HPE-FE) in the home gateway according to capability of the home gateway;

the Co-located PD-FE issuing a suitable policy to the HPE-FE in the selected home gateway;

the HPE-FE performing policy control for user's service traffic according to the received QoS policy.

Furthermore, the method may have the following features:

after the HPE-FE receives the QoS policy, the method further comprises the following steps of:

the HPE-FE returning an acknowledgement message to the Co-located PD-FE, and the Co-located PD-FE returning an acknowledgement to the PD-FE.

After the PE-FE receives the QoS policy, the method further comprises the following steps of:

the PE-FE returning an acknowledgement to the PD-FE; and after receiving the acknowledgement from the PE-FE and the Co-located PD-FE, the PD-FE returning a resource request acknowledgement to the SCF.

Furthermore, the method may have the following features:

when a Home Gateway Configuration Server receives an online notification of the home gateway or an administrator actively performs policy configuration, the Co-located PD-FE issuing a static QoS policy to the HPE-FE in the home gateway;

after receiving said static QoS policy, the HPE-FE performing policy control for the user's service traffic according to said QoS policy and returning an acknowledgement to said Co-located PD-FE.

The beneficial effects of the present invention are: with the apparatus, system and method for implementing the policy control for home gateways in accordance with the present invention, the RACF avoids controlling the home gateways directly or sending policy to the home gateways by configuring a Co-located PD-FE in the server for controlling and managing the home gateways remotely in the case that there are a lot of home gateways and the home gateways are scattered at the edge of the network.

PREFERRED EMBODIMENTS OF THE PRESENT INVENTION

The technical scheme of the present invention will be described in further detail in conjunction with the accompanying figures and embodiments.

In the following, the apparatus, system and method for implementing policy control for home gateways in accordance with the present invention will be described in detail by referring to the accompanying FIG. 4 to FIG. 6.

Since there are a lot of HGs and they are scattered at the edge of the network, the Co-located PD-FE in the apparatus for implementing policy control for HGs can be used to perform the policy control for HGs. As shown in FIG. 4, the Co-located PD-FE can be deployed in the existing server controlling and managing the HGs remotely, such as the Auto-Configuration Server (ACS), and Rd interface (Diameter protocol) is applied between the Co-located PD-FE and the PD-FE, while Rh interface is applied between the Co-located PD-FE and the HPE-FE in the HG to transport policy (TR069 protocol). Wherein, the Co-located PD-FE is used to receive the QoS policy sent by the PD-FE at the side of network and issue the QoS policy to the HGs or issue the QoS policy configured on it to the HGs.

Figure 1:
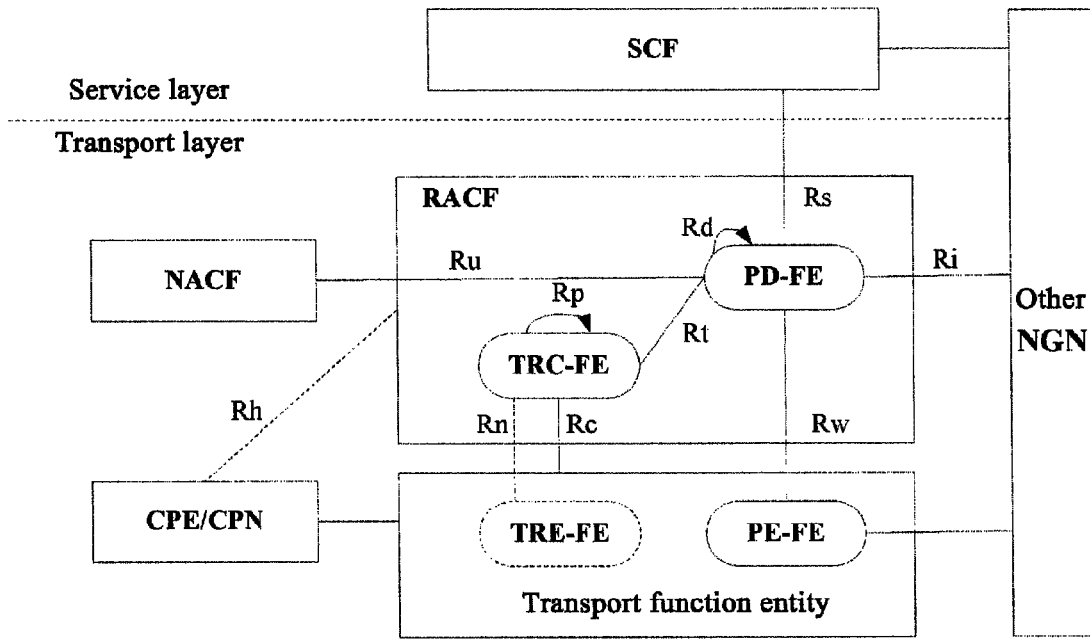
FIG. 1 is a framework of the ITU-T RACF subsystem in the prior art.
Figure 2:
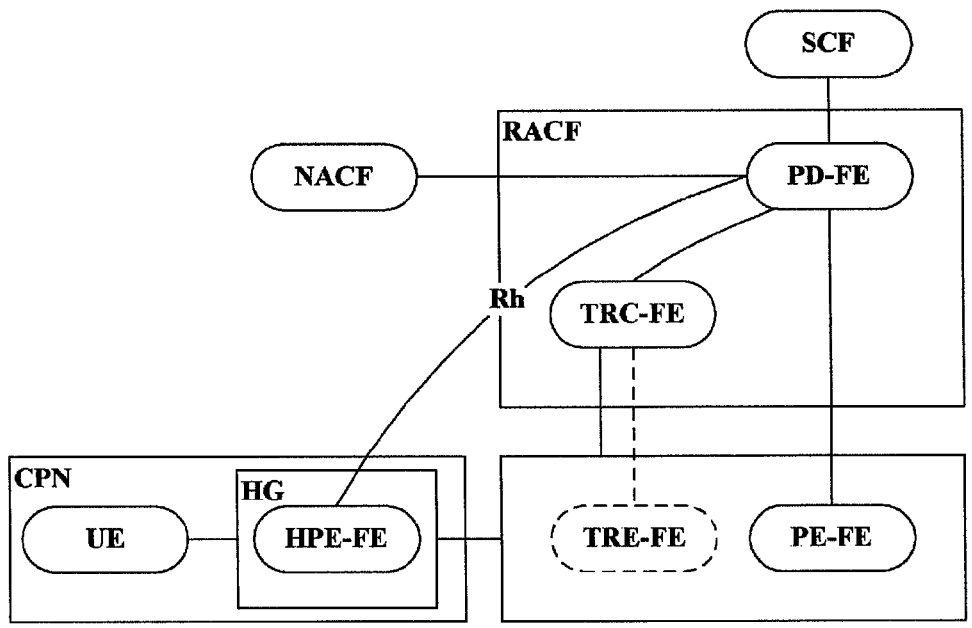
FIG. 2 is an illustration of the RACF controlling home gateways in the prior art.
Figure 3:
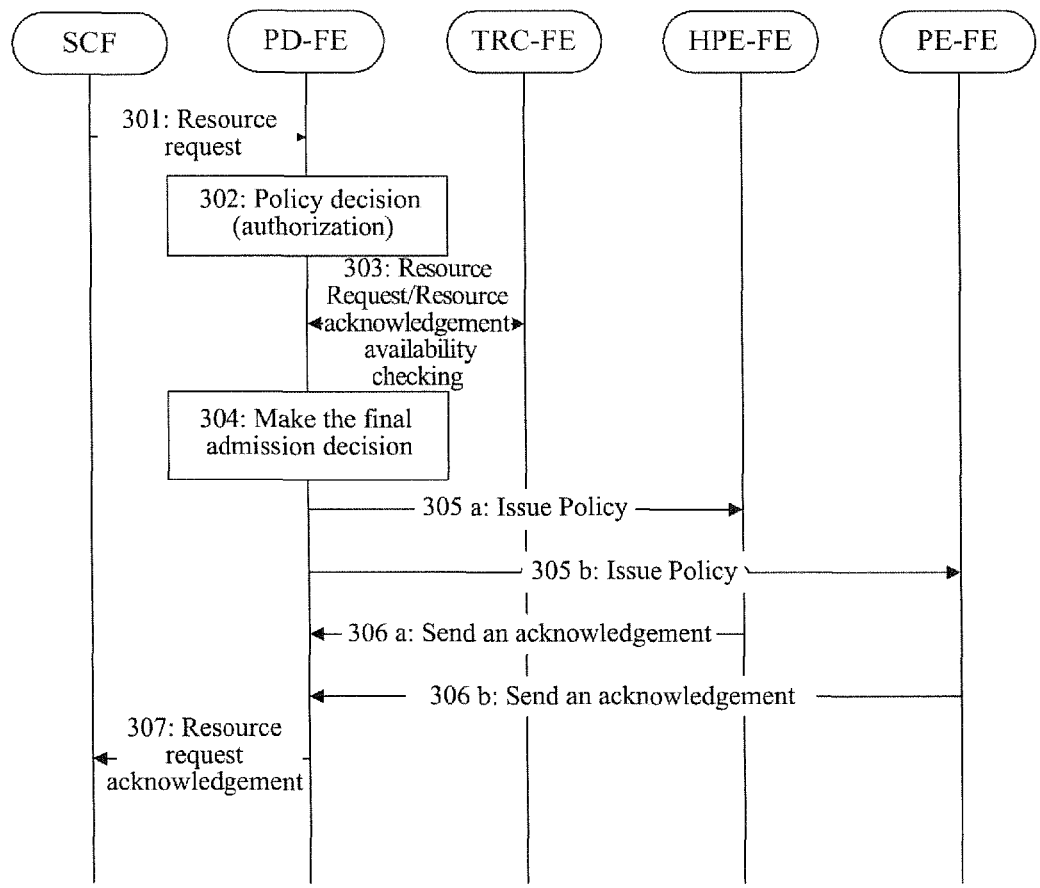
FIG. 3 is an illustration of the process of policy control in the prior art.
Figure 4:
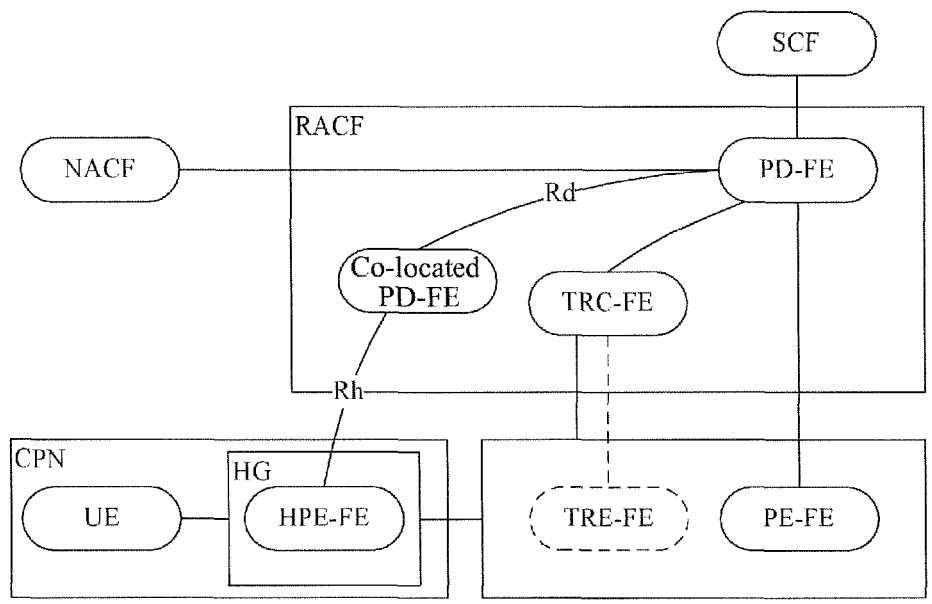
FIG. 4 is an illustration of the RACF controlling home gateways through the policy agent function in accordance with an embodiment of the present invention.

As shown in FIG. 4, the system for implementing the policy control for HGs comprises a SCF, a PD-FE at the side of network, a TRC-FE, a PE-FE and a CPN besides of the above Co-located PD-FE. Wherein, the specific function of each network element can be embodied in the following method and is not described here to avoid redundancy.

There are two ways, dynamic and static ways, to control the QoS policy for HGs.

The dynamic QoS policy control means that the SCF sends a corresponding QoS policy request to the RACF according to the QoS requirement of a service when a user dynamically initiates the service, and the RACF performs admission decision according to the condition of resource, and if the request is admitted, the RACF generates QoS policy and sends the QoS policy to the HPE-FE and the PE-FE for execution; when the service is cancelled, the corresponding policy is dynamically deleted.

The static QoS policy control means that the QoS policy related to the user subscription service is issued to the HGs by the remote configuration or when there is user online, and the HPE-FE in the HG guarantees the QoS of the corresponding service according to this static policy.

Figure 5:
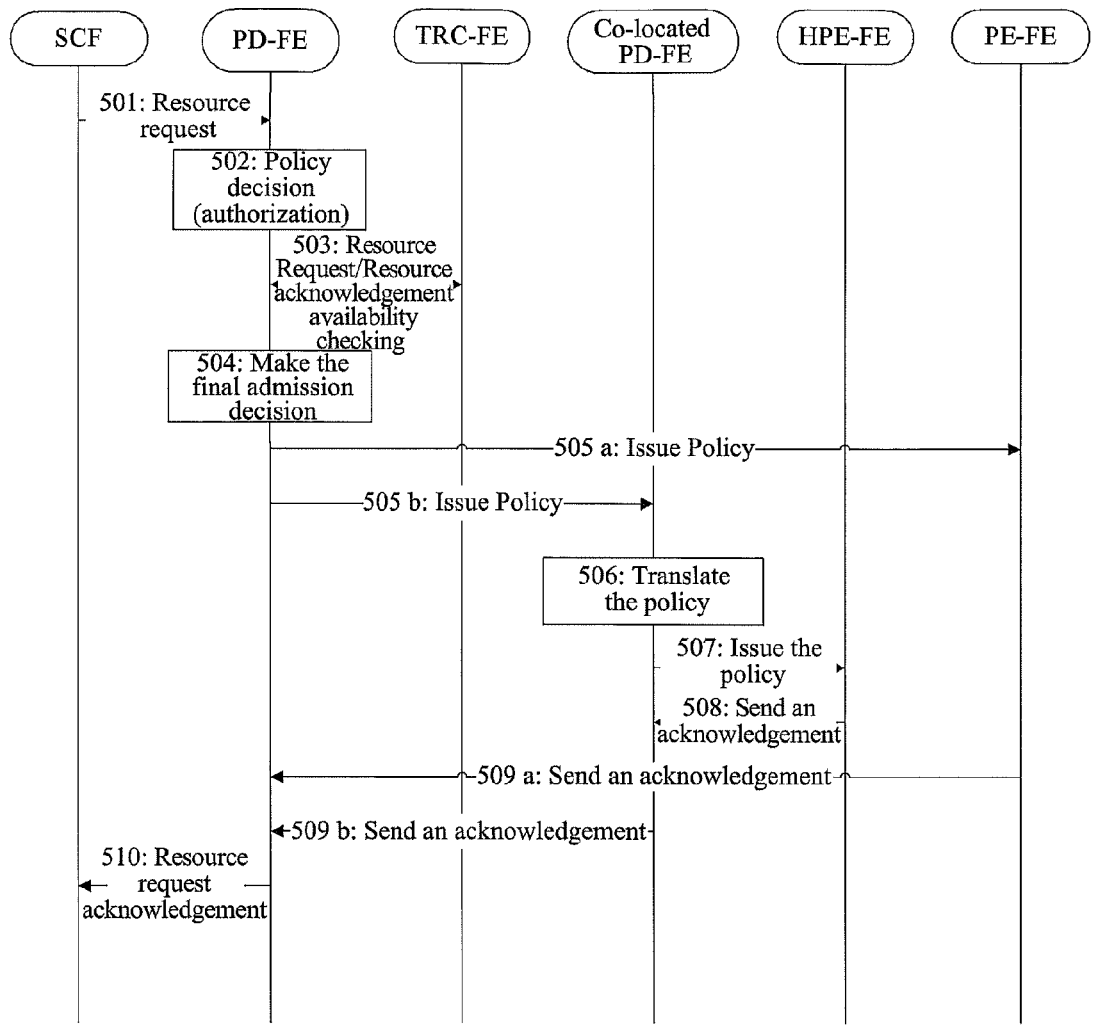
FIG. 5 is a flow chart of performing dynamic policy control for home gateways in accordance with an embodiment of the present invention.

The method for implementing the policy control is specified as follows:

FIG. 5 is a flow chart of processing the dynamic QoS policy, and it comprises the following steps:

Step 501: a user initiates a QoS guaranteed service, and the service layer determines the QoS of this service through negotiation, and the SCF sends a resource request to the PD-FE according to the QoS negotiated by the service layer;

Step 502: the PD-FE authorizes the request and makes the preliminary policy decision, and if the PD-FE does not have the user subscription information, the PE-FE needs to acquire the user subscription information by interacting with the NACF;

Step 503: the PD-FE requests the TRC-FE for resource, and the TRC-FE makes a decision for the request according to the condition of the current resource, and returns the resource availability information indicating whether there is enough available resource or not;

Step 504: the PD-FE makes the final admission policy decision according to the resource availability information;

Step 505 a, b: the PD-FE issues the policy to the PE-FE and the Co-located PD-FE respectively;

Step 506: after the Co-located PD-FE receives the policy, it selects a suitable HG according to the policy and translates the policy to the one supported by the HPE-FE in the HG according to the capability of the HG, wherein, the suitable HG is the one used by the user initiating the QoS guaranteed service;

Step 507: the Co-located PD-FE issues the suitable polity to the HPE-FE in the selected HG;

Step 508: the HPE-FE returns an acknowledgement message to the Co-located PD-FE;

Step 509 a, b: the PE-FE and the Co-located PD-FE respectively returns an acknowledgement to the PD-FE;

Wherein, it should be noted that there is no order between step 509a and step 506 to step 508, that is, as long as the PE-FE receives the issued policy, it could returns an acknowledgement to the PD-FE without needing to wait for the execution result of step 506 to step 508;

Step 510: the PD-FE returns a response request acknowledgement to the SCF.

After step 507, there are the following steps: the HPE-FE performs the policy control for the user's service traffic according to the received QoS policy.

Figure 6:
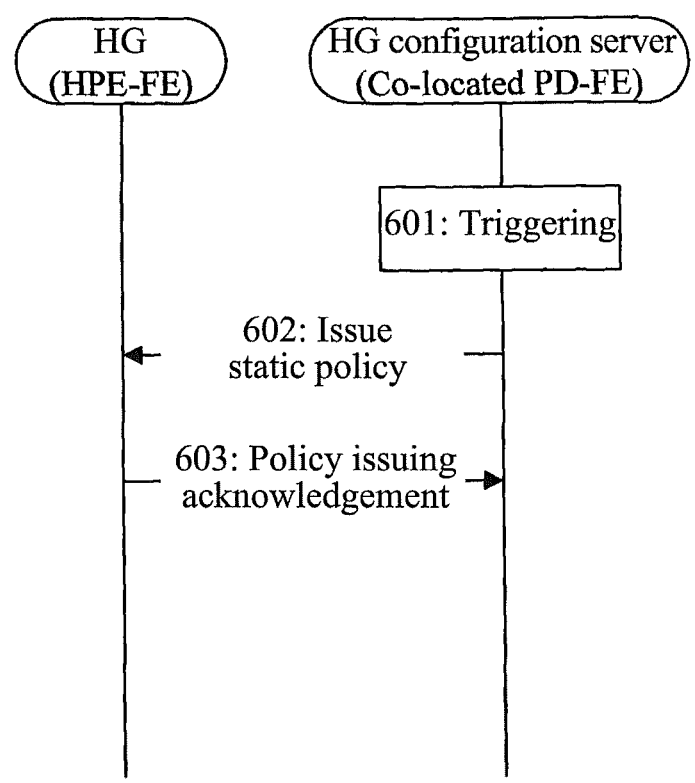
FIG. 6 is a flow chart of performing static policy control for home gateways in accordance with an embodiment of the present invention.

FIG. 6 is a flow chart of processing the static QoS policy, and it comprises the following steps:

Step 601: processing the static QoS policy sent by the HGs can be triggered by the HG configuration server when receiving the HG online notification or by the manager by actively performing the policy configuration;

Step 602: the Co-located PD-FE issues the static QoS policy configured on it to the HPE-FE in the HG;

Step 603: after the HPE-FE receives the policy, it performs the policy control for the user's service traffic according to the received QoS policy, and returns an acknowledgement to the Co-located PD-FE.

To sum up, with the apparatus, system and method for implementing the policy control of HGs in accordance with the present invention, by configuring a Co-located PD-FE in the server for controlling and managing the HGs remotely, it avoids the RACF directly controlling the HGs or issuing policy to the HGs in the condition that there are a lot of HGs and the HGs are scattered at the edge of the network.

INDUSTRIAL APPLICABILITY

With the apparatus, system and method for realizing the policy control of home gateways in accordance with the present invention, by configuring a Co-located PD-FE in the server for controlling and managing the home gateways remotely, it avoids the RACF directly controlling the home gateways or sending policy to the home gateways in the condition that there are a lot of home gateways and the home gateways are scattered at the edge of the network.

What is claimed is:

1. An apparatus for implementing policy control for a home gateway, said apparatus comprising a Co-located Policy Decision Function Entity (PD-FE);
   said Co-located PD-FE being configured to receive a Quality of Service (QoS) policy decided and sent by a PD-FE at network side, to select a home gateway in a Customer Premises Network according to the QoS policy, translate the QoS policy to a QoS policy supported by the home gateway according to capability of the home gateway, and to send the QoS policy supported by the home gateway to said home gateway;
   wherein said home gateway performs policy control for service traffic according to received QoS policy;
   wherein said Co-located PD-FE and the PD-FE are connected via an Rd interface at network side; and said Co-located PD-FE and said home gateway are connected via an Rh interface.

2. The apparatus of claim 1, wherein,
   said Co-located PD-FE is configured in a server controlling and managing said home gateway remotely.

3. The apparatus of claim 2, wherein,
   said server controlling and managing the home gateway remotely is an auto-configuration server (ACS).

4. A system for implementing policy control for a home gateway, the system comprising:
   a Service Control Function (SCF),
   a Policy Decision Function Entity (PD-FE) at network side,
   a Transport Resource Control Function Entity (TRC-FE),
   a Policy Execute Function Entity (PE-FE),
   and a Customer Premises Network (CPN), and the system further comprising:
   a Co-located PD-FE configured to receive a Quality of Service (QoS) policy decided and sent by the PD-FE at network side, select a home gateway according to the QoS policy, translate the QoS policy to a QoS policy supported by the home gateway according to capability of the home gateway, and to send the QoS policy supported by the home gateway to the home gateway in the CPN;

wherein, the home gateway in said CPN comprises a Home Policy Execute Function Entity (HPE-FE) for receiving QoS policy issued by said Co-located PD-FE and performing policy control for service traffic according to said QoS policy;

wherein said Co-located PD-FE and the PD-FE are connected via an Rd interface at network side; and said Co-located PD-FE and said home gateway are connected via an Rh interface.

5. The system of claim 4, wherein,
said Co-located PD-FE is configured in a server controlling and managing said home gateway remotely.

6. A method for implementing policy control for a home gateway, the method comprising the following steps of:

a Co-located Policy Decision Function Entity (PD-FE) receiving a Quality of Service (QoS) policy decided and sent by a PD-FE at network side;

said Co-located PD-FE selecting a home gateway in a Customer Premises Network according to the QoS policy, and translating the QoS policy to a QoS policy supported by the home gateway according to capability of the home gateway; and said Co-located PD-FE sending said QoS policy supported by the home gateway to said home gateway; wherein said home gateway performs policy control for service traffic according to the QoS policy received;

wherein said Co-located PD-FE and the PD-FE are connected via an Rd interface at network side; and said Co-located PD-FE and said home gateway are connected via an Rh interface.

7. The method of claim 6, further comprising the following steps of:

a user initiating a QoS guaranteed service, and a service layer determining the QoS of the service through negotiation, and a Service Control Function (SCF) initiating a resource request to the PD-FE at network side according to the QoS policy negotiated by the service layer;

said PD-FE authorizing said resource request, making a preliminary policy decision, and then requesting a Transport Resource Control Function Entity (TRC-FE) for resource;

said TRC-FE making a decision for said resource request according to the current resource condition and returning a resource availability information indicating whether there is enough available resource or not;

said PD-FE making a final admission policy decision according to the resource availability information and issuing the policy to a Policy Execute Function Entity (PE-FE) and said Co-located PD-FE;

after receiving the policy, the Co-located PD-FE selecting a suitable home gateway according to the policy and translating the policy to a policy supported by a Home Policy Execute Function Entity (HPE-FE) in the home gateway according to capability of the home gateway;

the Co-located PD-FE issuing a suitable policy to the HPE-FE in the selected home gateway;

said HPE-FE performing policy control for a user's service traffic according to the received QoS policy.

8. The method of claim 7, specifically comprising the following steps of:

when a Home Gateway Configuration Server receives an online notification of the home gateway or an administrator actively performs policy configuration, the Co-located PD-FE issuing a static QoS policy to the HPE-FE in the home gateway;

after receiving said static QoS policy, the HPE-FE performing policy control for a user's service traffic according to said QoS policy and returning an acknowledgement to said Co-located PD-FE.

* * * * *